B. HATCHELL.
ANIMAL TRAP.
APPLICATION FILED MAY 19, 1909. RENEWED MAY 12, 1910.
978,742.
Patented Dec. 13, 1910.
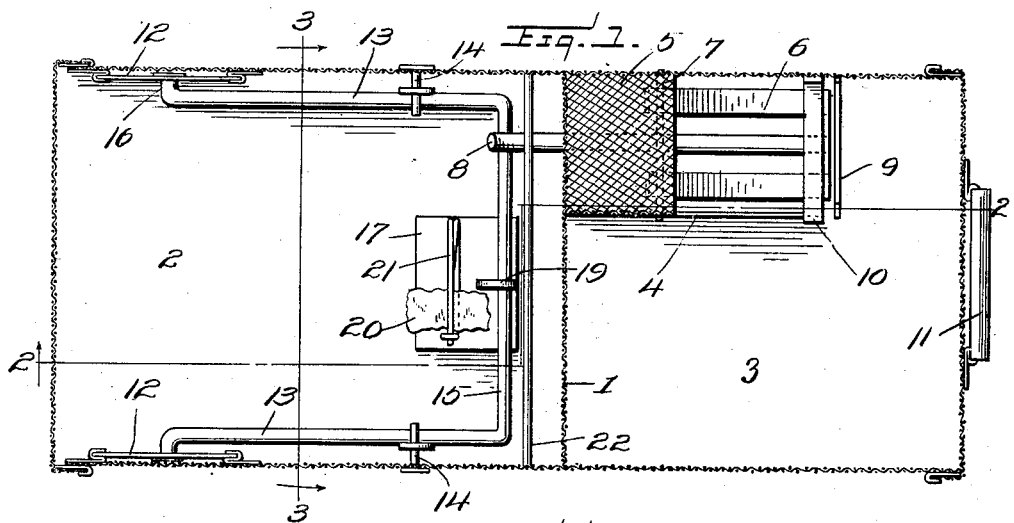
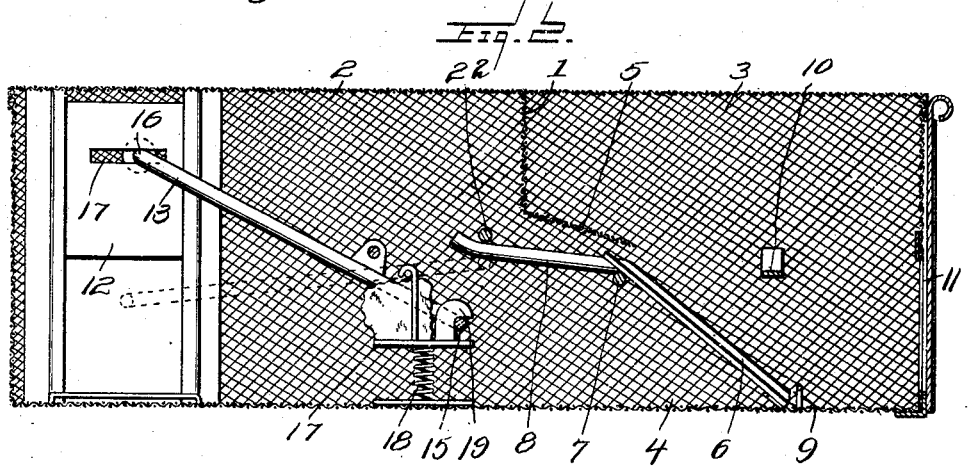
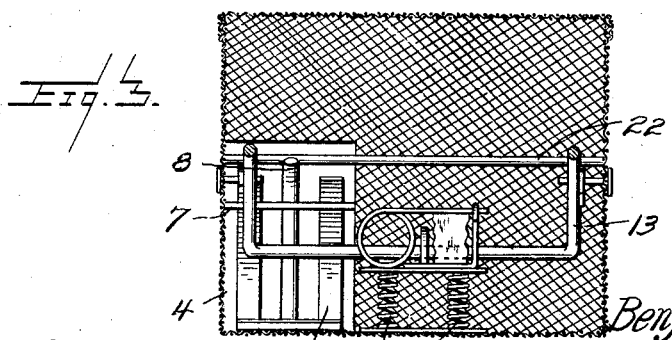
Inventor
Benjamin Hatchell.
Witnesses
E. R. Ruppert.
U. B. Hillyard.
By Victor J. Evans
Attorney

UNITED STATES PATENT OFFICE.

BENJAMIN HATCHELL, OF CROCKETT, TEXAS.

ANIMAL-TRAP.

978,742.  Specification of Letters Patent.  Patented Dec. 13, 1910.

Application filed May 19, 1909, Serial No. 497,034. Renewed May 12, 1910. Serial No. 560,982.

*To all whom it may concern:*

Be it known that I, BENJAMIN HATCHELL, a citizen of the United States, residing at Crockett, in the county of Houston and State of Texas, have invented new and useful Improvements in Animal-Traps, of which the following is a specification.

The purpose of the present invention is to provide a novel form of trap of the type adapted to be automatically set by the entrapped animal when passing from one chamber or compartment of the cage into another or imprisoning compartment or chamber.

The purpose of the invention is the provision of a trap embodying novel actuating means including the bait holder and trigger and the concomitant parts controlling the door leading into the cage with the result that said parts comprise a minimum number and are certain and positive in operation, thereby insuring the entrapping of the animal and the retention of the animal after being entrapped as well as the resetting of the trap by the animal when passing through from one part of the trap to the other.

The invention consists of the novel features, details of construction and combinations of parts as will be hereinafter more particularly set forth, illustrated in the accompanying drawings and pointed out in the appended claims.

Referring to the drawings forming a part of the specifications: Figure 1 is a top plan view of a trap embodying the invention, the top being omitted. Fig. 2 is a vertical longitudinal section on the line 2—2 of Fig. 1 looking in the direction of the arrows. Fig. 3 is a transverse section on the line 3—3 of Fig. 1 looking to the right as designated by the arrows.

Corresponding and like parts are referred to in the following description and indicated in all the views of the drawings by the same reference characters.

The body of the trap may be of any construction and size depending upon the special purpose for which intended, it being understood that when adapting the invention for entrapping larger animals, the capacity of the trap must be correspondingly enlarged as also the adjunctive parts.

The trap is particularly designed for small animals in which event due regard must be had for strength.

The body of the trap illustrated is of rectangular formation and constructed of wire fabric in the form of a cage. The body of the trap or cage is subdivided by means of a partition 1 into two compartments or chambers 2 and 3. The chamber 2 receives the bait and the trigger mechanism and may be designated as the bait chamber in contradistinction to the imprisoning chamber 3 which serves to confine the entrapped animals. A passage 4 establishes communication between the two chambers 2 and 3 and is preferably located at one side of the cage so as to provide a maximum imprisoning space and also to utilize a portion of one side of the cage as one wall of the passage. A guard 5 extends over the entrance portion of the passage 4 and prevents return of the imprisoned animals to the bait chamber after entering the imprisoning chamber. The guard 5 preferably consists of a portion of the partition 1 partly cut therefrom and pressed laterally so as to overhang the entrance portion of the passage. A door 6 normally closes the passage 4 and is pivotally supported at 7 upon a rod having its ends let into opposite walls of the passage. The door 6 is open, that is, formed of spaced strips and normally inclines forwardly and downwardly as indicated most clearly in Fig. 2. An arm 8 projects rearwardly from the door 6 and extends into the bait chamber 2 and is designed to reset the trap. A guard 9 extends in front of the lower end of the door 6 to prevent any one of the imprisoned animals from raising the door and escaping from the chamber 3 into the chamber 2. A cross bar 10 extending over the inner or forward end of the passage 4 limits the upward movement of the door 6 when tilted. A door 11 closes an opening in the front end of the cage and is slidably mounted in suitable keepers or guides. Other doors 12 close openings in opposite sides of the cage and are likewise slidably mounted in keepers or guides. A lever 13 is pivotally mounted at 14 to a side of the cage and is connected at one end to the adjacent door 12. The pair of levers 13 at opposite sides of the cage are connected by means of a cross bar 15. The two levers 13 and the cross bar 15 constitute parts of a stout wire which has its end portions bent to provide the levers 13, the terminal portions being outwardly bent as indicated at 16 to pass through transverse slots 17 formed in the doors 12. The extremities of the outwardly bent ends 16 are upset and provided with washers to prevent casual disengagement thereof from the doors. By having the levers 13 connected by the cross bar 15, both operate in unison and both doors 12 open or close simultaneously.

The trigger comprises a plate 17 which is mounted upon a spring support 18 which is connected at its lower end with the bottom of the cage or trap. The spring support 18 may consist of one or more coil springs, as indicated in Figs. 2 and 3, thereby admitting of the plate 17 having a limited movement in every direction. A hook 19 is secured to the plate 17 or may form a part thereof and projects vertically and is adapted to engage over the cross bar 15 and hold the same depressed and the doors 12 elevated. The construction and arrangement of the parts are such as to insure sensitiveness when the plate 17 is moved so as to release the cross bar 15 and admit of the doors 12 closing quickly thereby entrapping the animal.

The bait 20 is retained upon the plate 17 by means of a holder 21 which consists of a length of spring wire bent to provide two members connected at one end by a coil, one member having its end portion bent and formed into a hook to receive the free end of the other member as shown most clearly in Figs. 2 and 3. The holder is soldered or otherwise firmly attached to the plate 17.

A rod 22 extends transversely of the cage near the partition 1 and forms a guard to prevent the animal entrapped in the bait chamber from depressing the bar 15 and resetting the trap whereby an escape can be provided. When the doors 12 are closed the cross bar 15 comes beneath the guard bar 22 as indicated by the dotted lines in Fig. 2.

When the trap is set, the bait 20 is secured upon the plate 17 and the doors 12 are elevated and the cross bar 15 engaged under the hook 19. An animal passing into the trap enters the bait chamber through one or the other of the openings closed by the doors 12 and being attracted by the bait 20 causes a movement of the plate 17 when nibbling or attempting to obtain such bait thereby disengaging the hook 19 from the cross bar 15 when the doors 12 will instantly close. The animal is thus entrapped in the bait chamber and seeking to escape therefrom passes through the passage 4 into the imprisoning chamber 3. When passing through the passage 4 the animal elevates the door 6 and at the same time depresses the arm 8 which latter extending over the cross bar 15 depresses the same and opens the doors 12 and causes the cross bar 15 to engage under the hook 19 thereby resetting the trap. The instant the animal clears the door 6, the latter automatically closes and retains the animal in the chamber 3.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what is claimed is—

1. In an animal trap comprising a cage having an opening, a door for closing said opening, and a lever having connection with the door to hold the same open, a plate, a spring support for the plate to admit of its having movements in every direction, a hook projected from the plate and adapted to engage the said lever to hold the door open, and a bait holder mounted upon the plate.

2. In an animal trap comprising a cage having openings in opposite sides, doors for closing said openings, pivotally mounted levers having connection with said doors for operating the same, a cross bar connecting corresponding ends of the levers, a trigger adapted to engage said cross bar to hold both doors open, and a guard bar extending transversely of the cage and located immediately above said cross bar to prevent depression thereof by the entrapped animal after the doors have been closed.

3. The herein described trap comprising a cage subdivided to provide a bait chamber and an imprisoning chamber and having a passage between the two chambers, a pivotally mounted door for closing said passage having an arm extending therefrom, doors for closing openings in opposite sides of the cage, levers having engagement with said doors, a cross bar connecting said levers and extended into the path of the arm projecting from the pivotally mounted door, a trigger for engaging said cross bar to hold the doors open, and a guard bar extending transversely of the cage and immediately over the cross bar connecting the said levers.

In testimony whereof I affix my signature in presence of two witnesses.

BENJAMIN HATCHELL.

Witnesses:
T. B. SOTTERWHITE,
JOHN E. MONK.